US012474038B1

(12) United States Patent
Morter

(10) Patent No.: US 12,474,038 B1
(45) Date of Patent: Nov. 18, 2025

(54) HANGING LAMP SYSTEM WITH CONDUCTING STRAPS

(71) Applicant: Hubbardton Forge, LLC, Castleton, VT (US)

(72) Inventor: Guy Andrew Morter, Castleton, VT (US)

(73) Assignee: Hubbardton Forge, LLC, Castleton, VT (US)

( * ) Notice: Subject to any disclaimer, the term of this patent is extended or adjusted under 35 U.S.C. 154(b) by 0 days.

(21) Appl. No.: 18/829,127

(22) Filed: Sep. 9, 2024

(51) Int. Cl.

| | |
|---|---|
| ***F21V 23/00*** | (2015.01) |
| ***F21S 8/04*** | (2006.01) |
| ***F21S 8/06*** | (2006.01) |
| ***F21V 21/008*** | (2006.01) |
| ***F21V 21/03*** | (2006.01) |
| ***F21V 23/02*** | (2006.01) |
| ***F21V 23/06*** | (2006.01) |
| ***F21Y 115/10*** | (2016.01) |

(52) U.S. Cl.
CPC ............ *F21V 23/001* (2013.01); *F21S 8/046* (2013.01); *F21S 8/068* (2013.01); *F21V 21/008* (2013.01); *F21V 21/03* (2013.01); *F21V 23/023* (2013.01); *F21V 23/06* (2013.01); *F21Y 2115/10* (2016.08)

(58) Field of Classification Search
CPC ...... F21V 23/001; F21V 21/008; F21V 21/03; F21V 23/023; F21V 23/06; F21W 8/046; F21W 8/068
USPC .......................................................... 362/404
See application file for complete search history.

(56) References Cited

U.S. PATENT DOCUMENTS 11,391,452 B1 * 7/2022 Novakovic ......... F21V 21/0808
11,692,690 B2 * 7/2023 De Bevilacqua ....... F21V 21/16 362/458
2015/0170480 A1 * 6/2015 Chen .................. F21V 33/0008 362/396
2025/0075890 A1 * 3/2025 Yang ..................... F21V 23/001

* cited by examiner

*Primary Examiner* — Laura K Tso
(74) *Attorney, Agent, or Firm* — Loginov & Associates, PLLC; William A. Loginov

(57) ABSTRACT

This invention provides a hanging lamp system that uses low-voltage light sources interconnected by flattened webbing straps having internal conductive leads embedded therein. The straps are removably interconnected by interengaging snaps that provide both electrical and mechanical connections between straps arrangements of arbitrary length. Straps can be interconnected with one or more arrays of light sources along their length. One or more base straps can be removably/fixedly connected to the transformer. The straps are removably interconnected by snaps that provide both electrical and mechanical connections between strap arrangements of arbitrary length. Straps can be interconnected with one or more arrays of light sources. One or more base straps can be removably or fixedly connected to the transformer. The straps define at least two layers with spaced-apart strips of conductive foil sandwiched therebetween. The snaps pass through the foil and the material of the straps so as to conduct electricity.

20 Claims, 4 Drawing Sheets

HANGING LAMP SYSTEM WITH CONDUCTING STRAPS

FIELD OF THE INVENTION

This invention relates to lighting fixtures, and more particularly to hanging lam systems, typically employing a plurality of low-voltage light sources.

BACKGROUND OF THE INVENTION

Hanging lamps, or lighting fixtures, are a ubiquitous item in residential and commercial environments. Contemporary lighting arrangements are typically powered by household current (e.g. 110 VAC), and are increasing employing fixed or removable low-voltage light sources—for example arrays of high-output LEDs. LED lighting employs a transformer to convert the household AC current into a lower voltage DC current that is used by an LED driver circuit, which can be integrated with the LED slight source to energize the LED array. A variety of intensities and wavelengths of light can be generated by such light sources.

Notably, an advantage of a fixed LED array is that it can be formed into a wide range of shapes and sizes. Also advantageously, the use of low-voltage leads allows for reduced insulation around conductors and more variation in the design of leads between the transformer and the light source. Thus, there exists a substantial degree of design freedom in implementing lighting fixtures using low-voltage LED sources.

It is therefore desirable to provide a lighting fixture system using low-voltage light sources and leads with a unique appearance and variability.

SUMMARY OF THE INVENTION

This invention overcomes the disadvantages of the prior art by providing a hanging lamp system (and associated strap connection system) that uses low-voltage (e.g. LED) light sources interconnected by flattened leather or synthetic webbing straps having internal conductive leads embedded therein. The straps are removably interconnected by interengaging snaps that provide both electrical and mechanical connections between strap arrangements of arbitrary length. Straps can be interconnected with one or more arrays of light sources along their length. One or more base straps can be removably or fixedly connected to the transformer. The straps define at least two layers with spaced-apart strips of conductive foil (or similar material) sandwiched therebetween. The snaps pass through the foil and the material of the straps so as to conduct electricity.

In an illustrative embodiment a hanging lamp system includes a base adapted to mount to a wall or ceiling. The base includes at least one low-voltage current connection. A first strap is connected to the base, and includes a first pair of conductive strips that are spaced-apart and embedded in the first strap. The first pair of conductive strips are each electrically connected, respectively, to a pole of the low-voltage connection. At least a first lighting element is connected to the first pair conductive strips or the second pair of conductive strips. Illustratively, a first pair of snaps is electrically connected to each of the first pair of conductive strips adjacent to an end of the first strap opposite the base. A second strap can be connected to the base, and the second strap can include a second pair of conductive strips that are spaced-apart and embedded in the second strap. The second pair of conductive strips can be each electrically connected, respectively, to a second pair of snaps adapted to removably engage to first pair of snaps. The first lighting element can be connected to at least one of the first pair conductive strips and the second pair of conductive strips. At least a second lighting element can be connected to the first pair conductive strips or the second pair of conductive strips. At least one of the first lighting element and the second lighting element can be electrically connected to the first pair of conductive strips and the second pair of conductive strips by a pair of interengaging snaps. The base can include a low-voltage transformer interconnected with each pole of the low voltage connection and the first lighting element and the second lighting element can each include a plurality of high-output LEDs. The plurality of high-output LEDs can be mounted on a (e.g. circuit) board that is secured by a fastener that passes through the first strap and the second strap at a location between each of the pair of first conductive strips. The first strap can define two strap pieces adhered together with the first pair of conductive strips therebetween. Each of the snap caps can include a shaft that perforates and engages a confronting part of one of the first pair of conductive strips. At least one of the first strap and the second strap can be leather, polymer and/or fabric. At least one of the first pair of conductive strips and the second pair of conductive strips can be metal foil, metalized polymer or polymer with conductive ink. The first strap can define two strap pieces adhered together with the first pair of conductive strips therebetween and the second strap can define two strap pieces adhered together with the second pair of conductive strips therebetween, and wherein the two strap pieces of the first strap can each include holes for, respectively, receiving a snap cap for each of the first pair of snaps and the second pair of snaps. Each of the snap caps can include a shaft that perforates and engages a confronting part of one of the first pair of conductive strips and the second pair of conductive strips. The first lighting element comprises a pair of lights on each of opposite sides of the first strap.

In another illustrative embodiment a method for assembling a hanging lamp is provided. A base is provided with an electrical connection containing two low-voltage poles. A first pair of conductive strips are embedded between two pieces of a first strap and electrically engaging each of the conductive strips, respectively with a first pair of snaps. A second pair of conductive strips are embedded between two pieces of a second strap, and each of the second pair of conductive strips, are electrically engaged/connected, respectively, with a second pair of snaps. The first pair of snaps are electrically and mechanically engaged to the second pair of snaps. A lighting element is provided on one of the first strap or the second strap in electrical connection with the first pair of conductive strips or the second pair of conductive strips, respectively.

In another illustrative embodiment, a system for connecting a lamp base having low voltage connection poles to a lighting element includes a first strap that has two strap pieces adhered together with the first pair of conductive strips therebetween. The first pair of conductive strips are each electrically connected to each of the connection poles, respectively. Strap connections to the conductive strips are constructed and arranged to electrically connect at least one of (a) a first lighting element and (b) a second strap that includes two strap pieces adhered together with the second pair of conductive strips therebetween. Illustratively, the strap connections can comprise snaps that are electrically connected, respectively, to each of the conductive strips. Each of the snaps can include a snap cap having a shaft that perforates and engages a confronting part of one of the first pair of conductive strips. The first strap can be leather, polymer or fabric. At least one of the first pair of conductive strips and the second pair of conductive strips can be metal foil, metalized polymer and/or polymer with conductive ink.

BRIEF DESCRIPTION OF THE DRAWINGS

The invention description below refers to the accompanying drawings, of which.

DETAILED DESCRIPTION

Figure 1:
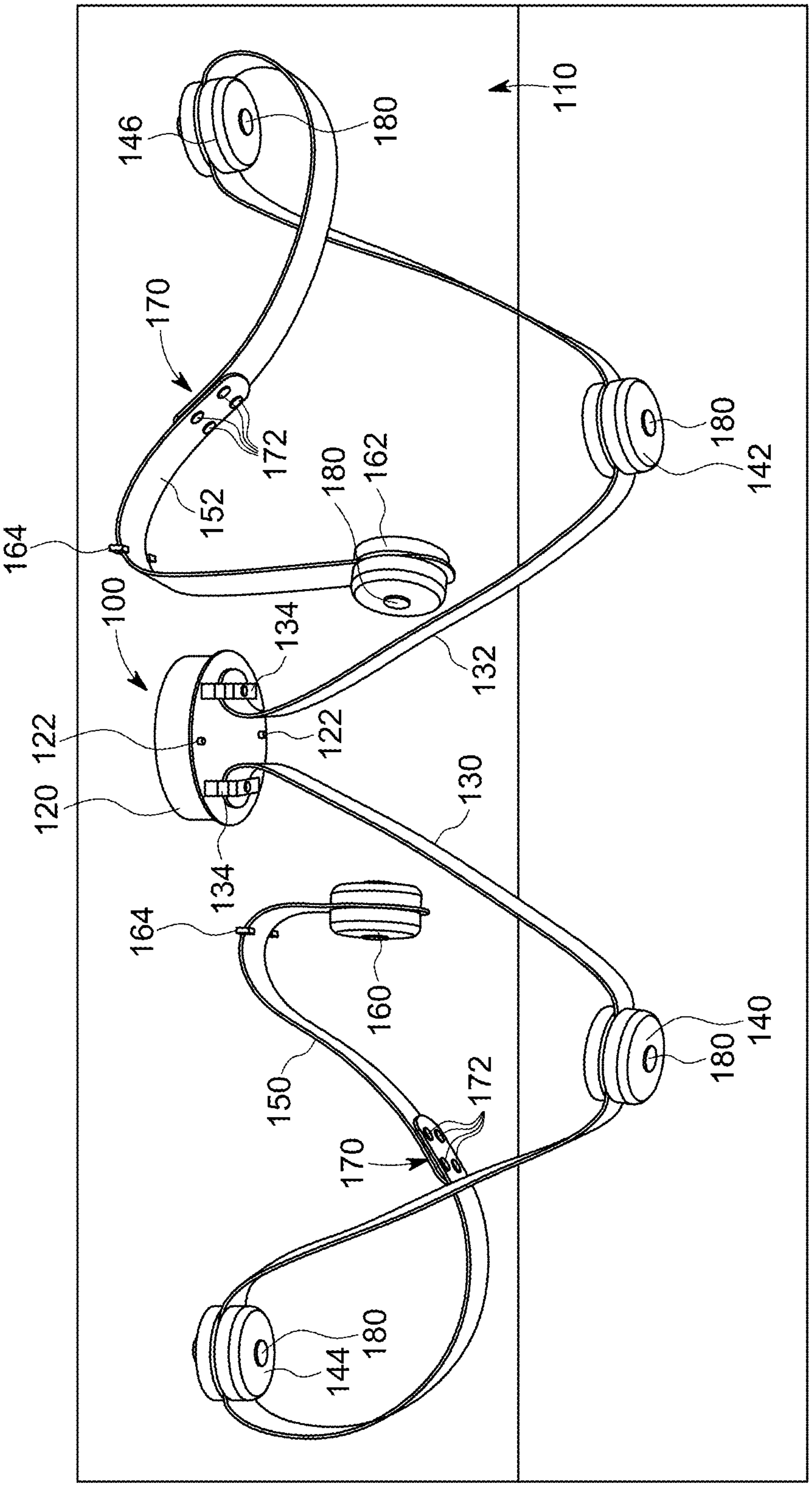
FIG. 1 is a diagram showing a perspective view of a hanging light fixture system with a plurality of light sources and on each of a respective plurality of straps interconnected by snaps according to an exemplary embodiment.
Figure 2:
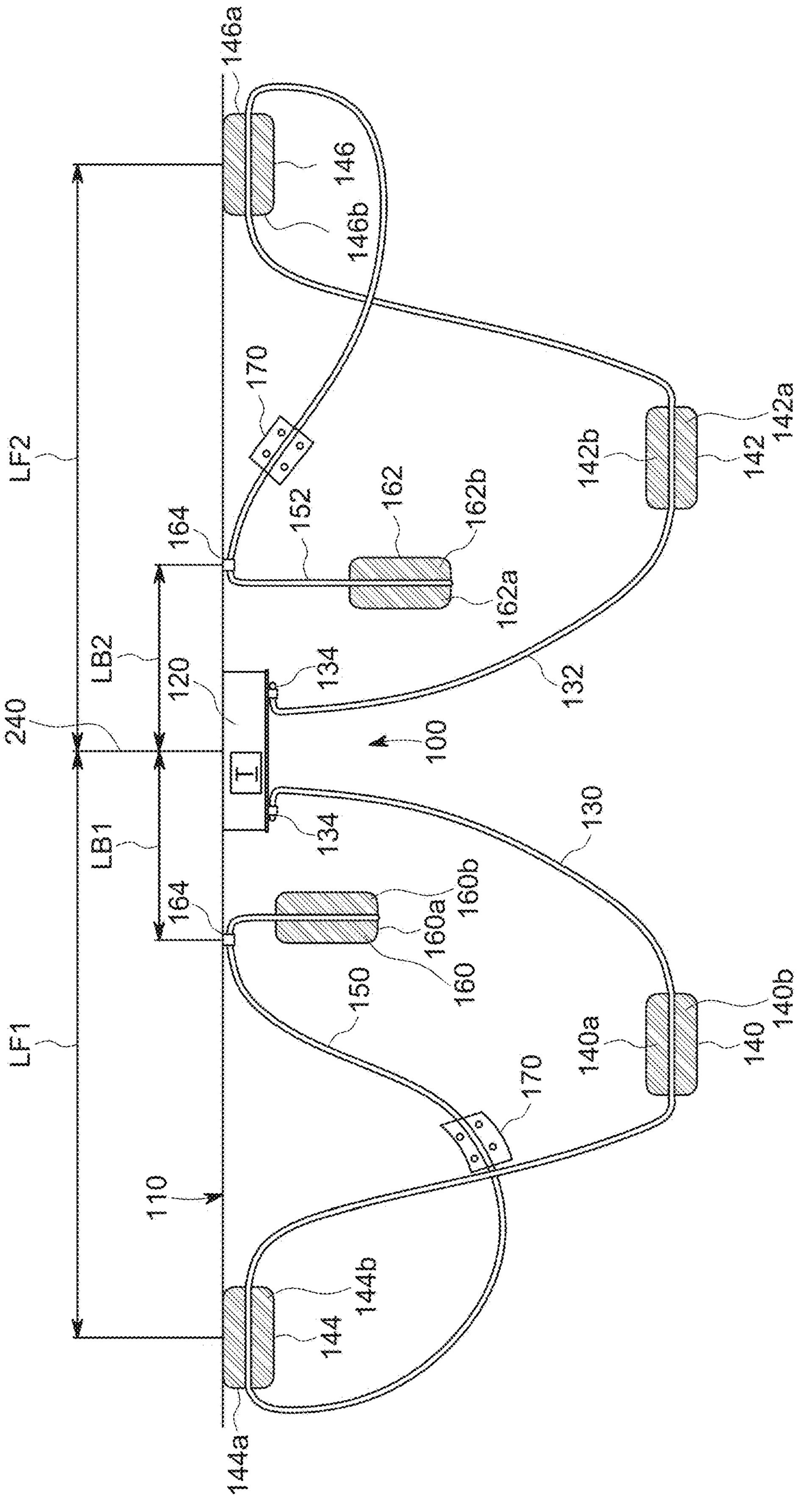
FIG. 2 is a diagram showing a side view of the hanging lighting fixture of FIG. 1.

FIGS. 1 and 2 show a hanging light fixture arrangement/system (also termed, briefly, "fixture") 100 shown in a mounted orientation with respect to (e.g.) a ceiling surface 110. The center of the fixture 100 defines a base 120 that includes an (e.g.) electronic transformer T (see FIG. 2), adapted to convert household AC current to DC voltage that is appropriate to drive LED array(s) (e.g. 5-15 Volts). In this example, the base is defined to engage a conventional fixture box with a pair of threaded bolts 122. Other fixation systems or connectivity are expressly contemplated—for example, a plug and socket interconnection. The base 120 is interconnected with two base connection straps 130 and 132 that extend from connection points 134, in each of opposing directions. The base connection straps 130 and 132 each, respectively, include (e.g.) two lighting elements 140, 144 and 142, 146. Each base connection strap 130 and 132 is removably connected to an outer strap 150 and 152, respectively. Each outer strap 150 and 152 further includes a respective lighting element 160 and 162.

As described further below, each of the lighting elements 140, 142, 144, 146, 160, and 162 can define a pair of opposing lights **140*a* and 140*b*, 142*a* and 142*b*, 144*a* and 144*b*, 146*a* and 146*b*, 160*a* and 160*b*, and 162*a* and 162*b*, respectively, each light in the pair is removably mounted on an opposing side of the strap in this example. Note that the style and configuration of lighting elements is exemplary of a wide range of possible designs. These designs can be uniform through the fixture 100**, or can be mixed for differing effects. It is contemplated generally, that all lighting elements on a given strap require similar voltage so as to be served by a single set of common electrical leads.

In this example, the lighting elements 144 and 146, as well as the mid-section of each outer strap 150 and 152 are secured to the ceiling 110. The lighting elements 144, 146 can be secured using a mounting base that is secured to the ceiling and passes though the center of the lighting element (as shown), or other fastener arrangements and/or double-sided adhesive tape. The mid-section of each outer strap 150, 152 are secured by a ceiling mounted bracket 164 that surrounds the strap without (free-of) engaging the electrical elements thereof.

By way of non-limiting illustration of the size and scale of an exemplary embodiment of the fixture 100, the respective distance LF1 and LF2 between the centerline 240 and the center of each respective outer lighting element 144 and 146 is approximately 24-28 inches (e.g. 24 inches). The distance LB1 and LB2 between the centerline 240 and each strap ceiling bracket 164 is approximately 6-10 inches (e.g. 8 inches).

The base connection straps 130 and 132 are connected mechanically and electrically to respective outer straps 150 and 152 at connection points 170. The connection points 170 in this exemplary arrangement define interengaging sets of snaps 172 that can be conventional metallic snap fasteners used, for example, with durable clothing, marine and/or outdoor applications. The end of each strap 130, 132 and 150, 152 includes a set of (e.g.) four male or female snaps, as described below.

Figure 3:
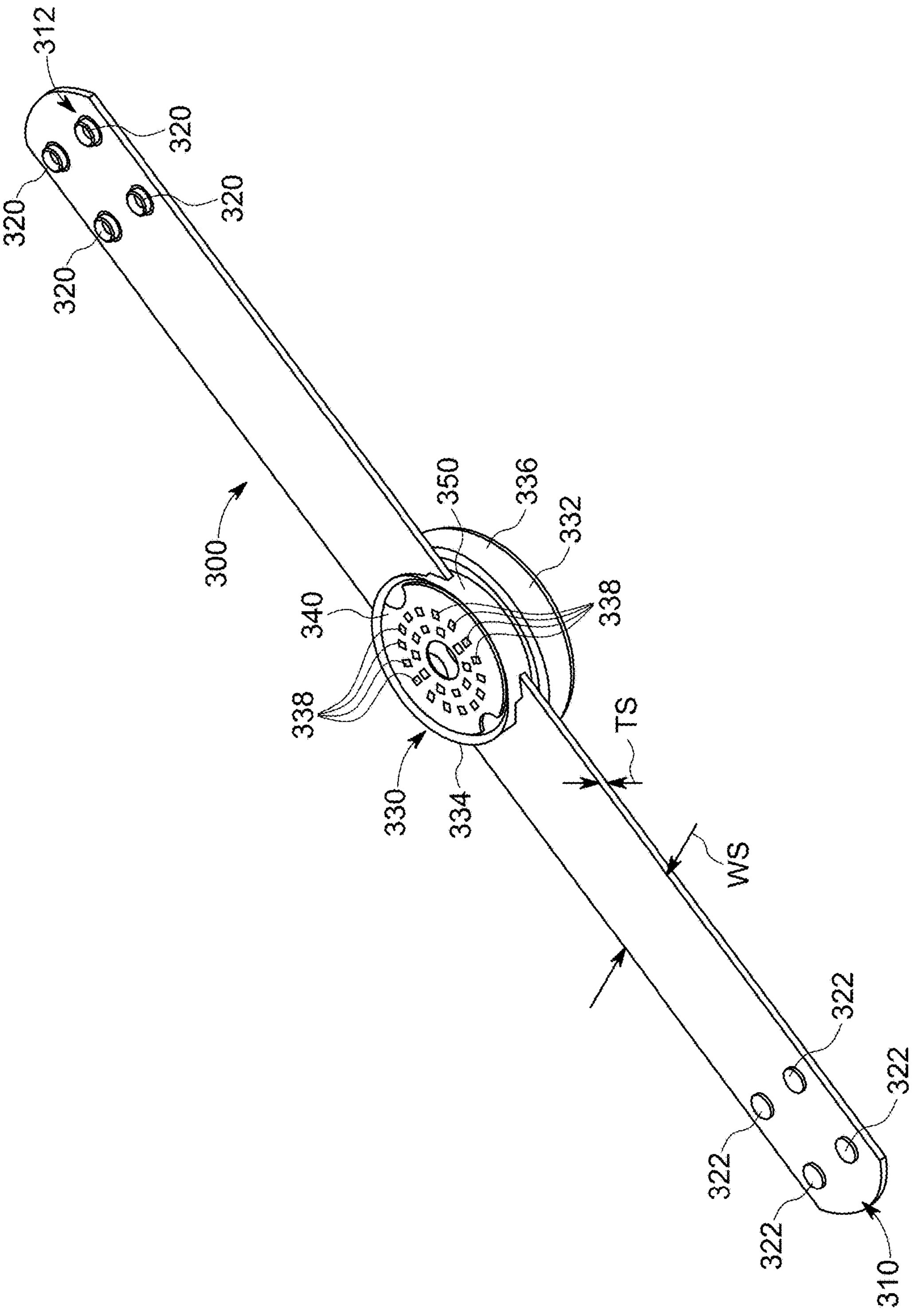
FIG. 3 is a diagram showing a perspective view of an exemplary strap and light source component for the hanging lighting fixture of FIG. 1.
Figure 4:
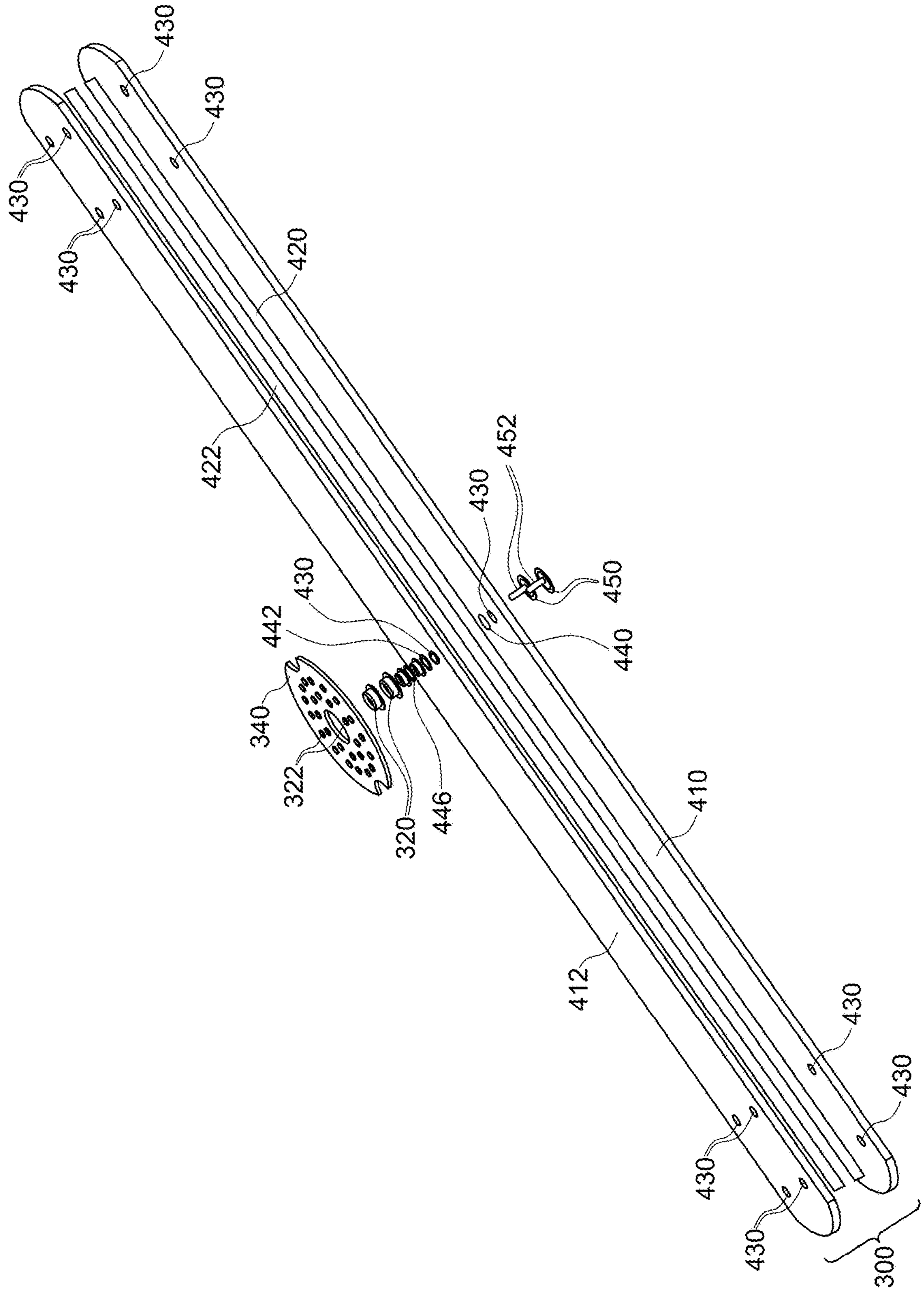
FIG. 4 is a diagram showing an exploded perspective view of the component of FIG. 3.

With reference to FIGS. 3 and 4, the construction of an exemplary strap 300 for use with the fixture 100 is shown in further detail. The strap can define any acceptable length, and appropriately proportioned width WS—for example, 1-2 inches. The strap can be constructed from any flexible material, including, but not limited to natural leather, vinyl, coated fabric, non-elastic fiber webbing, or combinations of such materials. The strap material can provide any reasonable thickness TS that defines a flexible structure—for example between ⅛ and ¼ inch. As shown in FIG. 3, the opposing end 310 and 312 of the strap 300. Each end 310 and 312 includes four snaps that can respectively be male 320 or female 322. Thus, each end of the strap 300 can engage an alternate end of an adjacent strap. The central region of the strap 300, in this example, includes a lighting element 330. The lighting element consists of two opposing, discrete lights 332 and 334 that are directed in opposite directions so as to provide a wide angular spread of illumination. The light 332 is shown with an overlying diffuser cap 336, which can be removable. The opposing light 334 is shown with its circular LED light board 340 exposed, and the associated diffuser omitted. The number and placement of discrete, high-output LEDs 338 on the board 336 is highly variable, depending upon the desired intensity and lighting effect. The overall lighting element 330 can further include a core 350 that can be slotted so as to slip over the strap end(s) and provide structural support from the LED board(s) and diffuser(s). The core can be constructed from any acceptable polymer or metal.

With reference to the exploded view of FIG. 4, the electrical connectivity of the strap arrangement and its underlying construction is shown in further detail. The strap 300 consists of two separate pieces 410 and 412 that overlap. They encase a pair of conductive strips 420 and 422 that are positioned remote from the strap outer edges and spaced-apart from each other so as to maintain two opposite (e.g. plus/minus DC) polarities. The conductive strips 420 and 422 can be any acceptable material—for example aluminum or copper foil, metalized polymer and/or conductive ink-coated polymer. In manufacture, the strips 420, 422 are applied to one of the strap pieces 410 and 412 overlying a plurality of aligned holes 430 that are provided in two parallel rows along the strap pieces. The two pieces 410, 412 are then adhered together using an appropriate heat-activated or solvent-activated adhesive (or other bonding technique relevant to the strap material). The resulting strap 300 has the appearance of an integral/unitary structure—for example a leather belt.

The central region of the strap, in this example, includes an enlarged hole 440 and 442 that receives a grommet interface 446. This is used to secure each overall light assembly (332 and 334) to the strap 330. An external center fastener 180 (see FIG. 1) passes through each light and into the grommet interface 446. The exposed head of the fastener 180 can be constructed with a pleasing design (e.g. a flush appearance around the diffuser) as shown.

The outer, strip-aligned perforations 420 allow a male or female snap (female 322 depicted in FIG. 4) to be secured by a snap cap 450 that passes through the respective holes 430 in the strap 300, and fixedly engages the snap relative to the strap. The snap cap 450 can be secured by a detent system, or by swaging (in the form of a rivet). Notably, the shaft 452 of each snap cap 450 passes through the conductive strip 420 or 422, causing the thin strip material to puncture and deform around the shaft 452. This structure, thus, defines a fully engaged electrical connection between the strip 420, 422 and the snap cap. Since the snap cap is in mechanical engagement with the sap 320, 322, the snap is energized by the strip 420, 422. As shown, all snaps on the left side of the strip carry one pole of the current, while all the snaps on the right side carry an opposing pole of the current.

In this embodiment, the male snaps in the central region of the strap 300 are adapted to engage opposing female snaps 322 mounted to connections on the LED board 340. This allows the board to be snapped into electrical engagement with the strap. The board includes appropriate LED driver circuitry that functions in a manner clear to those of skill, and is interconnected with the snaps 322. Another male, or female, snap can be provided to the opposing end of the snap cap 450 so as to mechanically and electrically engage the opposing light in the pair. Note that the snap connection arrangement for engaging lighting elements can be substituted for an alternate connection arrangement in alternate embodiments. The use of snaps allows for a consistent manufacturing techniques for all interconnected components. Thus, while not shown, the base 120 can also include snap connections to complete the electrical circuit between the base transformer and end(s) of the strap(s).

In alternate embodiments, the strap arrangement with spaced-apart conductive strips can be used to implement a variety of lighting and other low-voltage device applications. The strap can be a single structure between a base (typically including transformer connections) and the electrical device. Alternatively, a chain of interconnected/modular straps can be implemented. In various exemplary embodiments, straps can be used to connect audio components (e.g. speakers or microphones), sensors, antennae, etc. Thus, while a hanging lamp embodiment is shown and described, it is expressly contemplated that other applications in which one or more connection poles are interconnected over a distance can be supported by one or more straps herein. Also, while the strap herein carries two spaced-apart conductive strips, more or fewer strips can be sandwiched between the strap layers/pieces to interconnect additional poles. Additionally, while snaps are used to electrically and mechanically connect components and/or adjacent straps, other forms of permanent or detachable connectors that engage each conductive strip can be used—for example, screws and nuts, rivets, clips, pugs and sockets, etc.

It should be clear that the above-described hanging lamp system provides a unique and versatile design that is straightforward to manufacture and allows for a wide range of variation. The number and arrangement of lighting elements is variable and scalable as desired by the manufacturer and/or end user. This system allows for modular construction using various available components.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A hanging lamp system comprising:

a base adapted to mount to a wall or ceiling, the base including at least one low-voltage current connection;

a first strap connected to the base, the first strap including a first pair of conductive strips that are spaced-apart and embedded below a non-conductive surface in the first strap, the first pair of conductive strips each being electrically connected, respectively, to a pole of the low-voltage connection; and at least a first lighting element connected to the first pair of conductive strips.

2. The hanging lamp system as set forth in claim 1, further comprising:

a first pair of snaps electrically connected to each of the first pair of conductive strips adjacent to an end of the first strap opposite the base.

3. The hanging lamp system as set forth in claim 2, further comprising:

a second strap connected to the base, the second strap including a second pair of conductive strips that are spaced-apart and embedded in the second strap, the second pair of conductive strips each being electrically connected, respectively, to a second pair of snaps adapted to removably engage to first pair of snaps, and wherein the first lighting element is connected to at least one of the first pair conductive strips and the second pair of conductive strips.

4. The hanging lamp system as set forth in claim 3, further comprising at least a second lighting element connected to the first pair conductive strips or the second pair of conductive strips.

5. The hanging lamp system as set forth in claim 4, wherein at least one of the first lighting element and the second lighting element are electrically connected to the first pair of conductive strips and the second pair of conductive strips by a pair of interengaging snaps.

6. The hanging lamp system as set forth in claim 5, wherein the base includes a low-voltage transformer interconnected with each pole of the low voltage connection and the first lighting element and the second lighting element each include a plurality of high-output LEDs.

7. The hanging lamp system as set forth in claim 6, wherein the plurality of high-output LEDs are mounted on a board that is secured by a fastener that passes through the first strap and the second strap at a location between each of the pair of first conductive strips.

8. The hanging lamp system as set forth in claim 1, wherein the first strap defines two strap pieces adhered together with the first pair of conductive strips therebetween.

9. The hanging lamp system as set forth in claim 7, wherein each of the snaps includes a shaft that perforates and engages one of the first pair of conductive strips.

10. The hanging lamp system as set forth in claim 9, wherein at least one of the first strap and the second strap is leather, polymer or fabric.

11. The hanging lamp system as set forth in claim 9, wherein the at least one of the first pair of conductive strips and the second pair of conductive strips is metal foil, metalized polymer or polymer with conductive ink.

12. The hanging lamp system as set forth in claim 3, wherein the first strap defines two strap pieces adhered together with the first pair of conductive strips therebetween, and the second strap defines two strap pieces adhered together with the second pair of conductive strips therebetween, and wherein the two strap pieces of the first strap each include holes for, respectively, receiving a snap cap for each of the first pair of snaps and the second pair of snaps.

13. The hanging lamp system as set forth in claim 12, wherein each of the snap caps includes a shaft that perforates and engages one of the first pair of conductive strips and the second pair of conductive strips.

14. The hanging lamp system as set forth in claim 1, wherein the first lighting element comprises a pair of lights on each of opposite sides of the first strap.

15. A method for assembling a hanging lamp comprising the steps of:

providing a base with an electrical connection containing two low-voltage poles;

embedding a first pair of conductive strips between two pieces of a first strap and electrically engaging each of the conductive strips, respectively with a first pair of snaps;

embedding a second pair of conductive strips between two pieces of a second strap and electrically engaging each of the second pair of conductive strips, respectively with a second pair of snaps;

electrically and mechanically engaging the first pair of snaps to the second pair of snaps;

and providing a lighting element on one of the first strap or the second strap in electrical connection with the first pair of conductive strips or the second pair of conductive strips, respectively.

16. A system for connecting a lamp base having low voltage connection poles to a lighting element comprising:

a first strap that includes two strap pieces adhered together with a first pair of conductive strips therebetween, the first pair of conductive strips each being electrically connected to each of the connection poles, respectively; and strap connections to the conductive strips that are constructed and arranged to electrically connect at least one of (a) a first lighting element and (b) a second strap that includes two strap pieces adhered together with a second pair of conductive strips therebetween.

17. The system as set forth in claim 16, wherein the strap connections comprise snaps that are electrically connected, respectively, to each of the conductive strips.

18. The system as set forth in claim 17, wherein each of the snaps includes a snap cap having a shaft that perforates and engages one of the first pair of conductive strips.

19. The system as set forth in claim 16, wherein the first strap is leather, polymer or fabric.

20. The system as set forth in claim 16, wherein the at least one of the first pair of conductive strips and the second pair of conductive strips is metal foil, metalized polymer or polymer with conductive ink.

* * * * *